Figure 1:
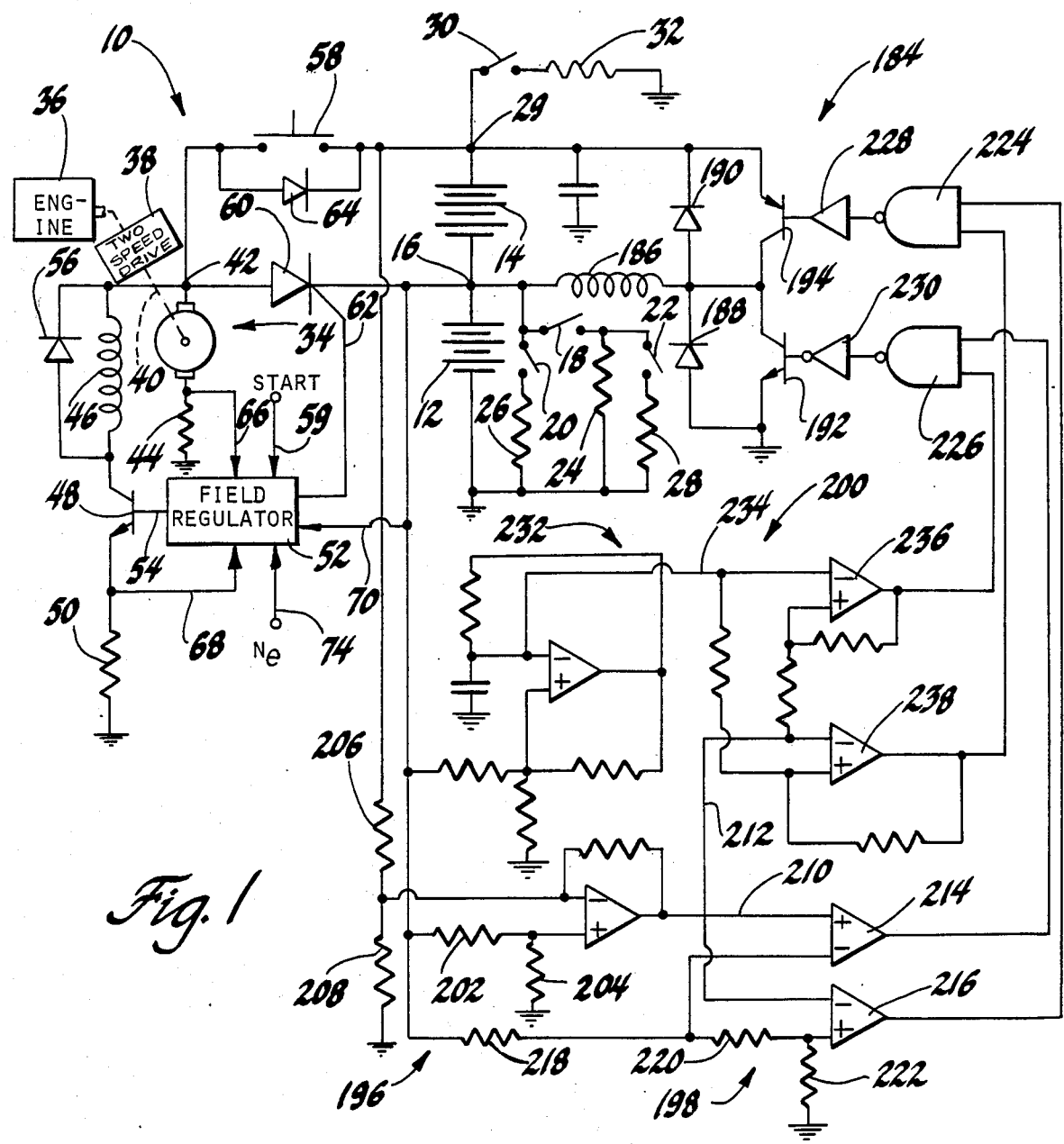

United States Patent [19]

Radomski

[11] Patent Number: 4,684,814
[45] Date of Patent: Aug. 4, 1987

[54] MOTOR VEHICLE ELECTRICAL SYSTEM INCLUDING A COMBINED STARTER/GENERATOR

[75] Inventor: Thomas A. Radomski, Utica, Mich.

[73] Assignee: General Motors Corporation, Detroit, Mich.

[21] Appl. No.: 881,597

[22] Filed: Jul. 3, 1986

[51] Int. Cl.⁴ .............................................. H02J 7/14
[52] U.S. Cl. ...................................... 290/31; 290/46; 320/6
[58] Field of Search .................. 290/31, 46; 320/6, 7, 320/15, 16, 61, 63

[56] References Cited

U.S. PATENT DOCUMENTS

| 1,257,163 | 2/1918 | Webster | 290/31 |
|---|---|---|---|
| 2,761,978 | 9/1956 | Piumi | 290/31 X |
| 3,270,207 | 8/1966 | Stockton | 290/31 |
| 3,536,982 | 10/1970 | Jackson | 290/46 X |
| 3,667,025 | 5/1972 | Campbell et al. | 320/15 |
| 3,671,843 | 6/1972 | Huntzinger et al. | 320/15 |
| 4,459,536 | 7/1984 | Wirtz | 290/46 X |
| 4,479,083 | 10/1984 | Sullivan | 320/6 |
| 4,491,779 | 1/1985 | Campbell et al. | 320/6 |
| 4,492,912 | 1/1985 | Nowakowski | 320/6 |
| 4,564,797 | 1/1986 | Binkley | 320/16 X |

Primary Examiner—William M. Shoop, Jr.
Assistant Examiner—W. E. Duncanson, Jr.
Attorney, Agent, or Firm—Mark A. Navarre

[57] ABSTRACT

A starter/generator in combination with a dual battery dual voltage motor vehicle electrical system and an equalization circuit for maintaining substantially equal charge on the batteries. In starting, the starter/generator is operated as an equivalent series motor from the serial combination of the two batteries to crank the engine. Upon starting, the starter/generator supplies charging current at one or the other of the system voltages, depending on the engine speed. At all times, the equalization circuit transfers energy from one battery to the other as required to maintain balanced battery voltages.

4 Claims, 9 Drawing Figures

MOTOR VEHICLE ELECTRICAL SYSTEM INCLUDING A COMBINED STARTER/GENERATOR

This invention relates to motor vehicle electrical systems, and more particularly to a control arrangement for a system including a starter/generator.

In conventional motor vehicle electrical systems, separate electrical machines are generally used to perform cranking and generating functions. Since the design criteria for the two functions are not the same, each machine may be designed to provide optimum performance of its designated function.

For a number of reasons, including space and weight conservation, it has been proposed to provide a single machine for performing both starting and generating functions. Such a machine is referred to herein as a starter/generator. However, motor and generator design considerations typically conflict, and the machine design may be seriously compromised to meet both starting and generating requirements. As a result, starter/generator machines have not been widely accepted.

This invention is based on the finding that a reasonable machine design can be achieved when the machine is used in connection with a dual voltage electrical system. The machine is coupled to the vehicle engine through a two speed gearset so that different machine/engine speed ratios are provided in the starting and generating modes.

A relatively low voltage (such as 12 volts) is used to supply operating current to low voltage vehicle electrical loads, and a relatively high voltage (such as 24 volts) is used to supply operating current to high voltage vehicle electrical loads and also to operate the starter/generator during starting. After the engine successfully starts, it drives the starter/generator, and an engine speed dependent control circuit regulates charging of the storage batteries. When the engine speed is relatively low (such as at idle), the generated voltage is limited, and the starter/generator is connected to supply charging current at the relatively low voltage. When the engine speed is relatively high, the generated voltage is not as limited, and the starter/generator is connected to supply charging current at the relatively high voltage. During such operation, the power output of the starter/generator is significantly increased since its current capability is determined primarily by the cross-sectional area of the windings, which is substantially independent of the generated voltage.

The dual voltage system is mechanized with two storage batteries. One of the batteries (referred to herein as the lower battery) defines the relatively low voltage and the other battery (referred to herein as the upper battery) is serially connected with the lower battery to define the relatively high voltage. The starter/generator is connected to the upper battery through a diode and to the lower battery through an SCR. When the engine speed is relatively low, the SCR is gated into conduction for charging of the lower battery. When the engine speed increases sufficiently, the generated voltage is momentarily interrupted to commutate the SCR, and the starter/generator charges the serial combination of the upper and lower storage batteries through the diode.

The state of charge of the two storage batteries is balanced by an equalization circuit which maintains the battery voltages substantially equal. When the lower battery becomes relatively depleted due to heavy demand from the low voltage electrical loads, its voltage droops relative to the upper battery, and the equalization circuit operates as a down-converter to transfer energy to it from the upper battery. When the upper battery becomes depleted due to prolonged low speed engine operation or heavy high voltage load demand, its voltage droops relative to the lower battery, and the equalization circuit operates as an up-converter to transfer energy to it from the lower battery. The equalization circuit includes an energy storage inductor connected to the junction of the upper and lower batteries, and converter means to effect the energy transfer therethrough.

As a result, the starter/generator is operated in an efficient manner, and battery charge imbalances which occur due to various driving schedules and loading are corrected as necessary.

IN THE DRAWINGS

Figure 2:
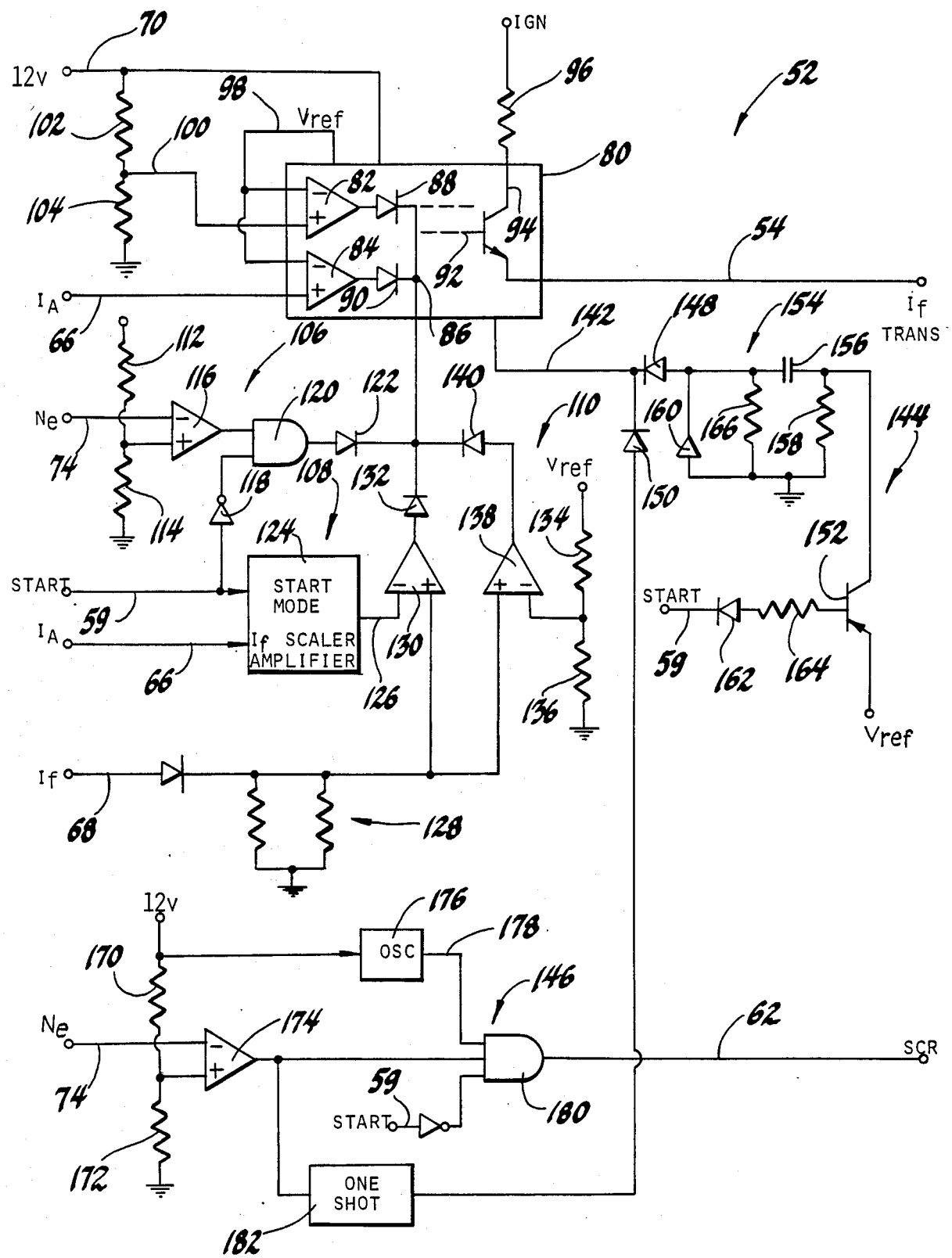

FIGS. 1–2 comprise a circuit diagram of a motor vehicle electrical system according to this invention.

Figure 3:
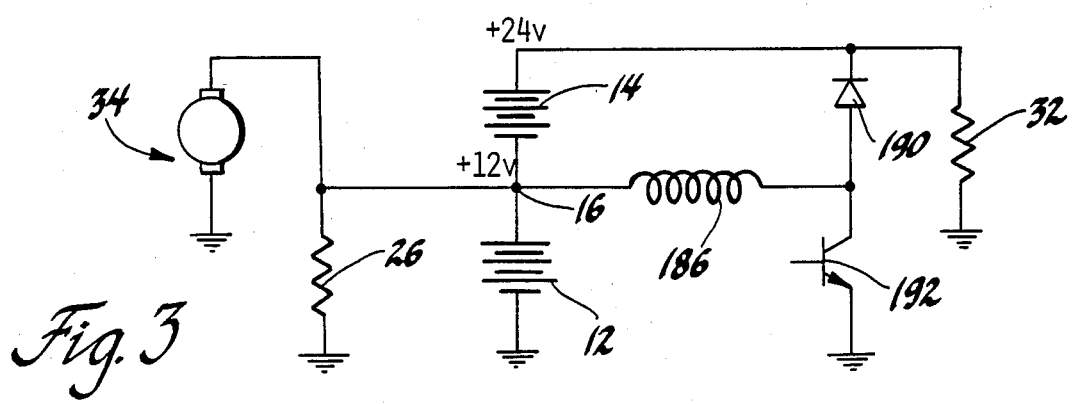
Figure 4:
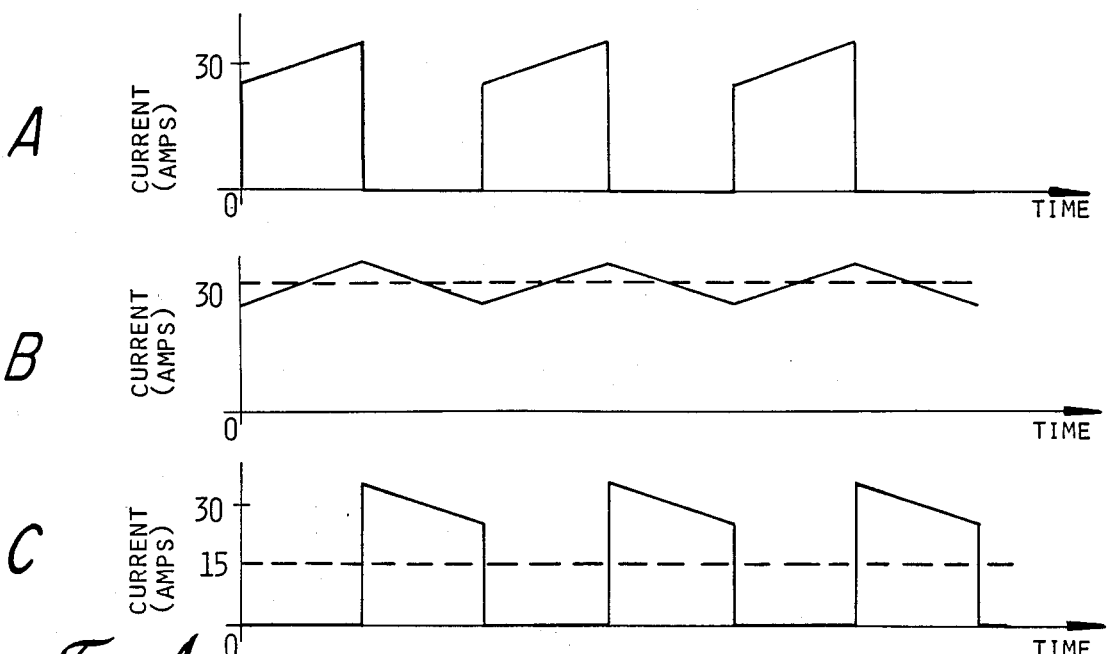

FIGS. 3 and 4 A, B and C depict an equivalent circuit during boost mode operation and corresponding current waveforms.

Figure 5:
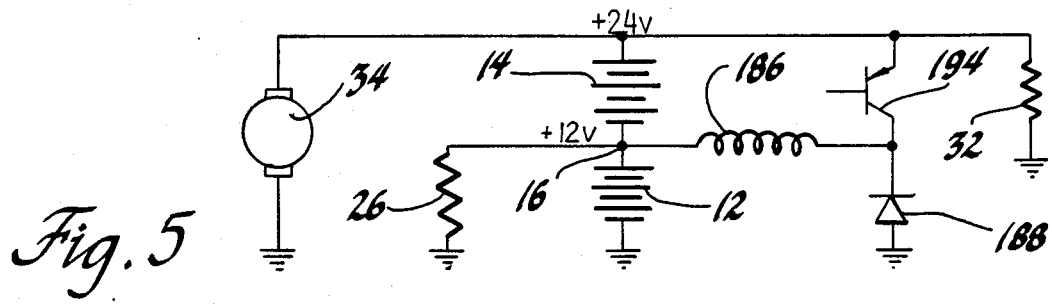

FIGS. 5 and 6A and B depict an equivalent circuit during buck mode operation and corresponding current waveforms.

Referring now to the drawings, and more particularly to FIG. 1, the reference numeral 10 generally designates a dual voltage automotive electrical system having two serially connected storage batteries 12 and 14. In the illustrated embodiment both batteries are conventional 12-volt cells, thereby defining a 12/24 volt electrical system with respect to the grounded negative terminal of battery 12. The 12-volt potential at the positive terminal 16 of battery 12 is connected via the ignition switch 18 to operate the engine ignition system, and via switches 20–22 to operate various other low voltage electrical loads such as lighting.

As explained below, the ignition switch 12-volt potential (IGN) is also used for engine cranking and generating. The ignition load is represented by the resistor 24, and the other loads are represented by the resistors 26–28. The 24-volt potential at the positive terminal 29 of battery 14 is connected to operate various high voltage electrical loads (an electric power steering unit, for example) as schematically represented by the switch 30 and the resistor 32. As explained below, the 24-volt potential is also used for engine cranking.

The reference numeral 34 generally designates a wound field DC machine, referred to herein as a starter/generator. The armature of starter/generator 34 is coupled to the vehicle engine 36 through a two-speed bi-directional drive 38, as indicated by the broken lines 40. The starter/generator 34 includes a conventional armature winding and commutator assembly (not shown), the armature winding being connected between the terminal 42 and ground potential via the current shunt 44. The field winding 46 is connected between the terminal 42 and ground potential via the collector-emitter circuit of transistor 48 and the current shunt 50. The conduction of transistor 48, and hence the duty cycle of field winding excitation, is controlled by the field regulator circuit 52 via line 54. A freewheeling diode 56 is connected in parallel with the field winding 46 to circulate the inductive energy stored therein upon deenergization thereof.

When the engine 36 is to be started, the start switch 58 is closed to connect the armature winding of starter/generator 34 to the 24-volt potential at terminal 29. At such time, a "START" input is applied via line 59 to the field regulator circuit 52 to indicate that the starting mode is desired. In the start mode, the starter/generator 34 cranks the engine 36 through the two-speed drive 38. The cranking speed ratio of drive 38 is chosen in relation to the nominal motoring speed of starter/generator 34 such that the engine 36 is cranked at approximately 80 RPM at −20 degrees F. In a mechanization of this invention, the nominal motoring speed at +25 degrees F. was about 225 RPM, and the machine/engine cranking speed ratio was 20:1.

Once the engine 36 starts and the start switch 58 is released, the engine 36 drives the armature of starter/generator 34 through the two-speed drive 38. At such point, the absence of a START input indicates that the generator mode is desired, and the field regulator circuit 52 operates the starter/generator 34 as a generator for charging the batteries 12 and 14. The generating speed ratio of drive 38 is chosen in relation to the engine operating speed range so that the armature of starter/generator armature is operated within its speed limits. In a mechanization of this invention, the machine/engine generating speed ratio was 3.34:1, limiting the armature speed to about 20,000 RPM at maximum engine speed.

At relatively low engine speeds (such as at idle), the armature speed is relatively low, and the generated voltage of starter/generator 34 is limited. Under such conditions—at engine speeds below 1200 RPM, for example—the regulator circuit 52 gates the SCR 60 into conduction via line 62, and the starter/generator 34 supplies charging current to the lower storage battery 12.

When the engine speed exceeds approximately 1200 RPM, the starter/generator 34 is capable of efficiently charging the serial combination of batteries 12 and 14. When this occurs, the field regulator circuit 52 momentarily interrupts the field winding excitation to commutate SCR 60. Thereafter, the starter/generator 34 is controlled to generate an output voltage of about 28 volts for charging the serial combination of batteries 12 and 14 via the diode 64.

The field regulator circuit 52 operates in response to a number of inputs as indicated above, and is set forth in greater detail in the circuit diagram of FIG. 2. The input and output lines depicted in FIG. 1 have been assigned corresponding reference numerals. In the starting mode, the regulator circuit 52 excites the field winding 46 in proportion to the armature winding excitation, as indicated by the voltage on line 66. In such mode, the starter/generator 34 operates as an equivalent series machine. The voltage on line 68 is provided as a feedback indication of the actual field winding excitation. In the generating mode, the regulator circuit 52 excites the field winding 46 as a function of the system voltage to maintain the charge of batteries 12 and 14. In such mode, the starter/generator 34 operates as a shunt field machine. The line 70 provides the regulator circuit 52 with an indication of the terminal voltage of battery 12. The START signal on line 59 is used to select the desired operating mode, and the engine speed signal on line 74 is used to select the generated voltage, and to control the conduction of SCR 60.

At the heart of regulator circuit 52 is a pulse-width-modulation (PWM) controller 80, such as the TL 494, manufactured by Motorola Semiconductor Products, Inc., Phoenix, Ariz. The controller 80 is an integrated circuit, but a few of the components thereof are schematically depicted in FIG. 2 for convenience in describing the operation of this invention. The internal amplifiers 82 and 84 are connected to the junction 86 via an OR gate comprising the diodes 88 and 90. In turn, the junction 86 is connected with other internal circuitry (not shown) for generating a pulse-width-modulated drive signal on line 92 for controlling the conduction of a drive transistor 94. The collector of drive transistor 94 is connected to the ignition switched voltage (IGN) via resistor 96 to supply drive current to field transistor 48 via line 54 in accordance with the drive signal on line 92. The duty cycle of the drive signal 92 is developed in accordance with the average voltage at junction 86 so as to regulate the generated voltage of starter/generator 34 at a desired level so long as the armature current does not exceed a specified limit.

Both the desired generating voltage and the armature current limit value are defined by an internally generated reference voltage $V_{ref}$ on line 98. The amplifier 82 compares the reference voltage $V_{ref}$ with a voltage feedback signal on line 100 defined by the voltage divider resistors 102–104, and the amplifier 84 compares the reference voltage $V_{ref}$ with the armature current feedback signal on line 66. Amplifier 82 serves as a conventional feedback error amplifier and controls the voltage at junction 86 in order to regulate the field winding excitation as previously described. For example, if the actual voltage is greater than the desired charging voltage, amplifier 82 will increase the voltage at junction 86, and thereby reduce the field winding excitation in order to regulate the charging voltage. Likewise, amplifier 82 can increase the voltage at junction 86 if the actual armature current exceeds the current limit value.

The internal junction 86 of PWM controller 80 is accessed by the circuits 106–110 via diodes 122, 132, and 140, which circuits effect external control of the field winding excitation under specified conditions.

The circuit 106 is responsive to the engine speed signal $N_e$, and functions to inhibit field winding excitation by driving the junction 86 to a high voltage potential when the generator mode is engaged and the driven speed of starter/generator 34 is too low to enable the production of substantial charging current. An additional benefit of this function is that the mechanical load of the generator is substantially removed, reducing the likelihood of engine stalling. The threshold speed is defined by the divider resistors 112–114, the output of comparator 116 being low when the threshold speed is exceeded. The START input on line 59 is inverted by inverter 118, and applied as an input to the AND-gate 120 along with the comparator output. The output of AND-gate 120 is connected to the junction 86 through diode 122, which operates as a third input to the OR-gate comprising diodes 88 and 90.

The circuit 108 is responsive to the armature current feedback signal on line 66, and serves to schedule the field winding excitation during the start mode of operation so that starter/generator 34 operates as an equivalent series machine. The block 124 represents a scaler amplifier effective when the START input indicates that the start mode is engaged for developing a desired field excitation signal on line 126 in proportion to the armature current signal on line 66. A peak detect circuit 128 detects the envelope of the field current feedback signal on line 68, and applies the same as an input to the comparator 130 along with the desired field excitation signal on line 126. The comparator output is high when the actual field current exceeds the desired, and low when the actual field current is less than the desired. The comparator output is applied to the junction 86 through diode 132, which operates as a fourth input to the OR-gate comprising the diodes 88, 90 and 122.

The circuit 110 is responsive to the field current feedback signal, and serves to inhibit field winding excitation when the field current exceeds a current limit value. The current limit value is defined by the voltage divider resistors 134-136, and is applied as an input to the comparator 138 with the output of the peak detect circuit 128. The comparator output is high when the field current envelope exceeds the current limit value, and the output is applied to the junction 86 through diode 140. The diode 140 operates as a fifth input to the OR-gate comprising the diodes 88, 90, 122 and 132.

The PWM controller 80 includes further internal circuitry (not shown) for establishing a variable dead zone which effectively inhibits the field winding excitation if the PWM duty cycle is less than a specified amount. The dead zone has a nominal or default value, and the line 142 (pin 4) is provided for varying the size of the dead zone. Specifically, the dead zone increases in direct relation to the voltage on line 142.

The circuits generally designated by the reference numerals 144 and 146 interface with the PWM dead zone control line 142 via the diodes 148 and 150. The diodes 148 and 150 define a two-input OR-gate, whereby either circuit can increase the size of the deadband.

The circuit 144 is responsive to the START input, and serves to control the rate of increase in field winding excitation at the initiation of the generator mode of operation. The circuit 144 comprises a transistor 152 responsive to the START input, and an RC network 154 for generating a control voltage at the anode of diode 148. When the START input on line 59 is high (indicating that the start mode is active), the transistor 152 is nonconductive, and the capacitor 156 of RC network 154 discharges through resistor 158 and diode 160. At such time, the control voltage at the anode of diode 148 is at or near zero, and has little or no effect on the dead zone of controller 80. When the start switch 58 is released, the START input goes low, and biases the transistor 152 into conduction through diode 162 and resistor 164. The reference voltage $V_{ref}$ is applied to the RC network 154 through the emitter-collector circuit of transistor 152, and begins charging the capacitor 156 through resistor 166. The control voltage on line 142 is immediately increased to nearly $V_{ref}$, and then begins to decrease as the voltage across capacitor 156 increases. When the capacitor 156 is completely charged, the control voltage is once again at or near zero.

In view of the above, it will be understood that the circuit 144 operates at the initiation of the generator mode of operation to effect an immediate increase in the level of the controller dead zone, and thereafter to progressively return the dead zone to its nominal or default level. This serves to effect a progressive increase in the mechanical load imposed by the starter/generator 34 when the engine 36 is first started.

The circuit 146 is responsive to the engine speed signal $N_e$ on line 74, and serves to control the conduction of SCR 60. The voltage divider resistors 170-172 define a reference engine speed below which the starter/generator can only generate sufficient charging current for the lower battery 12, and above which the starter/generator can be used to charge the serial combination of batteries 12 and 14. The comparator 174 compares the reference engine speed with the engine speed signal $N_e$, the comparator output being high when the engine speed is below the reference speed and low when the engine speed is above the reference speed. An oscillator 176 generates a series of relatively high frequency pulses on line 178, and such pulses are applied as an input to AND-gate 180 along with the output of comparator 174 and the inverted START input. The output of AND-gate 180 is connected to the gate terminal of SCR 60 via line 62 as indicated in FIGS. 1 and 2.

When the engine speed is less than the reference speed during the generator mode, the pulses of oscillator 176 are passed through AND-gate 180 and applied to the gate of SCR 60 to render it conductive. In such event, the starter/generator 34 supplies charging current only to battery 12. In the start mode, or in the generating mode when the engine speed is greater than the reference speed, the AND-gate 180 blocks the oscillator pulses.

At the point when the engine speed increases above the reference speed defined by the divider resistors 170-172, the output of comparator 174 undergoes a high-to-low voltage transition. The one-shot circuit 182 senses the high-to-low transition, and produces a pulse of predetermined duration (such as 1 second) at the anode of diode 150 in response thereto. This effects an immediate increase in the dead zone of PWM controller 80, thereby interrupting the output of starter/generator 34 and commutating the SCR 60. At the termination of the pulse, the dead zone is immediately returned to its nominal or default level, and the starter/generator 34 supplies charging current to the serial combination of batteries 12 and 14.

Referring again to FIG. 1, the reference numeral 184 generally designates a converter circuit for shifting energy between the storage batteries 12 and 14. If the low voltage load demand is especially high, the battery 12 may become depleted relative to the battery 14. In such case, the energy is transferred from the battery 14 to the battery 12. If the high voltage load demand is especially high and/or the engine is idling for an extended period, the battery 14 may become depleted relative to the battery 12. In such case, energy is transferred from the battery 12 to the battery 14.

The converter circuit 184 comprises the inductor 186, the diodes 188 and 190, and transistors 192 and 194. To transfer energy from battery 12 to battery 14, the transistor 192 is pulse-width-modulated and the converter circuit 184 operates as an up-converter. When the transistor 192 is biased conductive, the inductor 186 is charged with current, and when the transistor 192 is biased nonconductive, the energy stored in the inductor 186 is supplied to the battery 14 via diode 190. To transfer energy from battery 14 to battery 12, the transistor 194 is pulse-width-modulated and the converter circuit 184 is operated as a down-converter. When the transistor 194 is biased conductive, the inductor 186 is charged with current, and when the transistor 194 is biased nonconductive, the energy stored in the inductor 186 is supplied to the battery 12 via diode 188. While the transistors 192 and 194 are depicted as bipolar devices, it will be understood that other solid state switch devices such as MOSFET transistors could also be used.

An equivalent circuit and illustrative waveforms for the system during up-converter operation are depicted in FIGS. 3 and 4, respectively. The circuit elements of FIG. 3 have been assigned the same reference numerals as corresponding circuit elements of FIG. 1. The current through the collector-emitter circuit of transistor 192 is depicted in Graph A of FIG. 4; the current through inductor 186 is depicted in Graph B of FIG. 4; and the current through diode 190 is depicted in Graph 4C. In the illustrated embodiment, the average inductor current is maintained at about 30 A to provide an average charging current of about 15 A.

Figure 6:
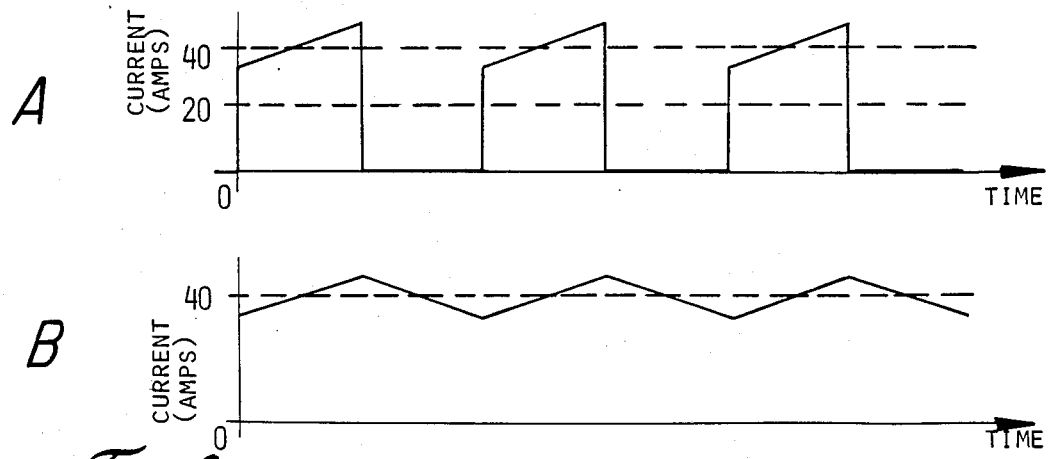

An equivalent circuit and illustrative waveforms for the system during down-converter operation are depicted in FIGS. 5 and 6, respectively. The circuit elements of FIG. 5 have been assigned the same reference numerals as corresponding circuit elements of FIG. 1. The current through the collector-emitter circuit of transistor 194 is depicted in Graph A of FIG. 6; and the current through inductor 186 is depicted in Graph B of FIG. 6. In order to provide an average charging current of about 40 A, the average inductor current is maintained at about 40 A by transistor 194, which drains an average of about 20 A from the 24 v source.

The control circuitry for pulse-width-modulating the transistors 192 and 194 generally comprises an error amplifier circuit 196, a window comparator 198, and a pulse-width-modulation circuit 200.

The error amplifier circuit 196 compares a fraction of the potential at battery terminal 16 (as determined by the divider resistors 202–204) with a fraction of the potential at battery terminal 22 (as determined by the divider resistors 206–208) to detect an imbalance in battery voltage. Such imbalance is amplified and applied as an input to window comparator 198 and pulse-width-modulation circuit 200 via lines 210 and 212.

The window comparator 198 comprises the comparators 214 and 216 for comparing the amplified voltage imbalance with a threshold imbalance defined by the voltage divider resistors 218–222. The comparator 216 enables the NAND gate 224 for down-converter operation whenever the voltage of battery 14 significantly exceeds the voltage of battery 12. The comparator 214 enables the NAND gate 226 for up-converter operation whenever the voltage of battery 12 significantly exceeds the voltage of battery 14. The NAND gate 224 is coupled to the base or control terminal of the converter transistor 194 via the noninverting buffer amplifier 228; and the NAND gate 226 is coupled to the base or control terminal of converter transistor 192 via the inverting buffer amplifier 230.

The pulse-width-modulation circuit 200 includes an oscillator circuit 232 for generating an appropriate triangular voltage waveform (20 kHz) on line 234 and a pair of comparators 236 and 238 for comparing the triangular waveform with the amplified voltage imbalance generated by the error amplifier 196. The comparator 238 supplies a pulse-width-modulation control signal to NAND gate 224 for down-converter operation when the amplified voltage imbalance indicates that the charge of battery 14 exceeds the charge of battery 12. The comparator 236 supplies a pulse-width-modulation control signal to NAND gate 226 for up-converter operation when the amplified charge imbalance indicates that the charge of battery 12 exceeds the charge of battery 14. In either case, the duty cycle of the pulse-width-modulation varies as a function of the imbalance magnitude.

The cooperation of the various system elements in a typical period of vehicle operation will now be described. When the ignition and start switches 18 and 58 are initially closed, the serial combination of batteries 12 and 14 is connected across the armature of starter/generator 34. The circuit 108 of field regulator 52 senses the armature current and generates proportional field excitation by pulse-width-modulating the transistor 48. In this mode, the starter/generator 34 operates as an equivalent series machine and cranks the engine 36 through the cranking speed ratio defined by drive 38.

When the engine 36 starts and its driveshaft begins rotating independently of the starter/generator, the operator releases start switch 58. At such time, the circuit 146 biases the SCR 60 into conduction, and the circuit 144 effects an immediate increase in the dead zone of PWM controller circuit 80. So long as the engine speed is greater than about 650 RPM (the threshold speed defined by circuit 106), the PWM controller 80 attempts to increase the field winding excitation for charging the battery 12. As circuit 144 returns the dead zone to its nominal level, the field excitation progressively increases, and the starter/generator begins generating. As the generated voltage increases, the starter/generator 34 begins supplying charging current to battery 12 through SCR 60 in the amount required to maintain the terminal voltage of the battery 12 at the level defined by the reference voltage $V_{ref}$. If the armature or field winding currents exceed their current limit values, the field winding excitation is removed through the operation of amplifier 84 or comparator 138.

If the engine speed should droop below about 650 RPM, the circuit 106 interrupts the field excitation. This increases the operating efficiency of the system (since the net generated power is insufficient for charging below such speed), and prevents engine stalling as well.

During low speed charging operation, the converter circuit 184 is effective in the up-converter mode to charge the upper storage battery 14 from the lower storage battery 12 as necessary to balance the battery voltage. Initially, such operation may be necessary to replenish the energy used in starting the engine. Thereafter, the amount of energy transfer will depend on the amount of high voltage loading that occurs.

When the engine speed increases above about 1200 RPM in the course of vehicle operation, the circuit 146 effects a momentary interruption of the generated voltage to commutate SCR 60. Thereafter, the starter/generator 34 supplies charging current to the serial combination of batteries 12 and 14 through the diode 64. In such operation, the PWM controller 80 regulates the field winding excitation such that the starter/generator 34 generates the voltage required to maintain the terminal voltage of battery 12 at the reference level of about 14-volts. As in the low speed charging, the field winding excitation is removed through the operation of amplifier 84 or comparator 138 if the armature or field winding currents exceed their respective current limit values.

During high speed charging, the converter circuit 184 is effective in the up-converter or down-converter modes as required to maintain a charge balance as between the batteries 12 and 14. If the low voltage loading is particularly heavy, the converter 184 will be operative in the down-converter mode to transfer energy from upper battery 14 to lower battery 12. If the high voltage loading is particularly heavy, the converter 184 will be operative in the up-converter mode to transfer energy from the lower battery 12 to the upper battery 14. In this way, the field regulator circuit 52, the starter/generator 34, and the converter circuit 184 cooperate to deliver electrical energy to the low and high voltage batteries and loads in order to satisfy the load demand with a balanced system.

In view of the above, it will be recognized that the converter circuit 184 operates to maintain substantial equality of charge between the storage batteries 12 and 14, regardless of variations in electrical loading and charging. It is the combination of the dual voltage electrical system and equalization (converter) circuit that makes usage of the starter/generator 34 feasible in a motor vehicle environment. The dual voltage enables the use of a practically sized starter/generator machine, and the equalization circuit enables practical usage of a dual voltage system which is subject to unequal loading and charging.

While this invention has been described in reference to the illustrated embodiment, various modifications will occur to those skilled in the art, and it will be recognized that systems incorporating such modifications may fall within the scope of this invention which is defined by the appended claims.

The embodiments of the invention in which an exclusive property or privilege is claimed are defined as follows:

1. In a motor vehicle including an engine and a starter/generator which is adapted to crank the engine during a starting mode before the engine has been started, and to be driven by the engine for generating electric current during a generating mode after the engine has been started, a system of electrical distribution, comprising:

a lower storage battery for supplying relatively low voltage operating current to low voltage vehicle electrical loads, and an upper storage battery operative in concert with said lower storage battery to supply relatively high voltage electrical current to said starter/generator during said starting mode and to other high voltage vehicle electrical loads;

charging control means connecting said starter/generator to the lower and upper storage batteries during said generating mode, such that the starter/generator supplies power solely to the lower battery when the engine speed is lower than a reference speed below which the output voltage of the starter/generator is limited, and to the serial combination of the upper and lower batteries when the engine speed is at least as great as said reference speed, thereby to effect battery charging in the most efficient manner; and charge equalizing means including an energy storage inductor connected to the junction of the upper and lower batteries, and converter means effective (1) when the lower battery becomes depleted due to heavy demand from the low voltage electrical loads to transfer energy from the upper battery to the lower battery through the energy storage inductor, and (2) when the upper battery becomes depleted due to prolonged engine operation below said reference speed or heavy high voltage load demand to transfer energy form the lower battery to the upper battery through the energy storage inductor, whereby the battery states of charge are maintained substantially equal in all vehicle operating conditions.

2. The system set forth in claim 1, wherein the converter means includes error amplifier means responsive to the voltages of the upper and lower storage batteries for regulating the energy transfer therebetween.

3. The system set forth in claim 1, wherein the starter/generator includes a field winding which is excited during the generating mode to regulate the charging voltage, and wherein the charging control means includes:

diode means connecting the starter/generator to the upper storage battery;

SCR means connecting the starter/generator to the lower storage battery;

means effective during the generating mode when the engine speed is below the reference speed for biasing the SCR means conductive to connect the starter/generator for charging the lower storage battery; and means effective when the engine speed rises above the reference speed for momentarily interrupting the excitation of the starter/generator field winding, whereby the voltage generated by the starter/generator is momentarily interrupted to commutate the SCR, and the starter/generator is connected for charging the serial combination of the upper and lower batteries.

4. The system set forth in claim 1, wherein the starter/generator includes a field winding, and wherein the system includes:

voltage control means effective during the generating mode for exciting the starter/generator field winding to regulate the generated voltage;

means defining a second reference speed below the normal idle speed of the engine, and below which the starter/generator is unable to generate sufficient current to charge the lower storage battery; and means effective during the generating mode when the engine speed is below the second reference speed for overriding the voltage control means and inhibiting the excitation of the starter/generator field winding, thereby to substantially remove the mechanical load of the starter/generator and reduce the likelihood of engine stalling.

* * * * *